A: CYCLIZATION
B: DEHYDROGENATION
C: ISOMERIZATION

United States Patent Office 3,775,498
Patented Nov. 27, 1973

3,775,498
PREPARATION OF 2,6-DIMETHYLNAPHTHALENE
Sheldon L. Thompson, Glen Mills, Pa., assignor to Sun Research and Development Co., Marcus Hook, Pa.
Filed June 9, 1972, Ser. No. 263,731
Int. Cl. C07c 15/24
U.S. Cl. 260—668 F                                26 Claims

ABSTRACT OF THE DISCLOSURE

A multistep process is disclosed wherein 5-o-tolylpentene-2 is converted to 1,5-dimethyltetralin in the presence of a solid acidic catalyst at 200–450° C. and preferably also recycled hydrogen, vapors from this conversion are reacted by contact at 300–500° C. in a hydrogen atomsphere with a solid dehydrogenation catalyst, preferably platinum on non-acidic alumina, to form 1,5-dimethylnaphthalene and hydrogen, vapors from the dehydrogenation reaction are contacted at 275–500° C. with a solid acidic isomerization catalyst to form 2,6-dimethylnaphthalene in admixture with mainly 1,6-dimethylnaphthalene and a small proportion of the 1,5-isomer, 2,6-dimethylnaphthalene is recovered from the isomerization product, e.g. by crystallization, and part of the generated hydrogen is recycled in the system. The process can be varied in several ways, including the utilization of a liquid acidic catalyst in either the first step or the isomerization step.

CROSS REFERENCES TO RELATED APPLICATIONS

U.S. application S.N. 207,870, filed Dec. 14, 1971, by J. A. Hedge describes the use of crystalline zeolite catalysts, which preferably are of the faujasite cage structure and preferably contain rare earth components incorporated by ion exchange, for hydroisomerization of dimethylnaphthalenes (DMN's).

U.S. application S.N. 208,001, filed Dec. 14, 1971, by G. Suld and R. L. Urban, likewise discloses the hydroisomerization of DMN's employing a calcium-containing crystalline zeolite catalyst preferably of the faujasite cage structure.

BACKGROUND OF THE INVENTION

This invention relates to the conversion of 5-o-tolylpentene-2 to 2,6-dimethylnaphthalene. The invention particularly concerns a multistep process wherein 5-o-tolylpentene-2 is first converted to 1,5-dimethyltetralin, the latter is dehydrogenated to 1,5-dimethylnaphthalene (hereinafter referred to as 1,5-DMN) and this product is then isomerized to form 2,6-dimethylnaphthalene (2,6-DMN).

The use of 2,6-DMN as a starting material for making polyester resins is known and procedures for obtaining 2,6-DMN in high purity for this purpose have heretofore been described; see, for example, the following United States patents: A. L. Benham 3,336,411, issued Aug. 15, 1967; M. E. Peterkin et al. 3,485,885, issued Dec. 23, 1969; J. A. Hedge 3,541,175, issued Nov. 17, 1970; and T. E. Skarada et al. 3,590,091, issued June 29, 1971. The 2,6-DMN can be partially oxidized to produce the 2,6-dicarboxylic acid which is particularly useful for the preparation of polyesters by reaction with aliphatic diols, such as ethylene glycol. The polyesters have utility in the manufacture of fibers, coatings and the like.

A procedure for making 1,5-DMN employing butadiene and o-xylene has been described by G. G. Eberhardt et al. in J. Org. Chem., 30, 82–84 (1965) and in Eberhardt U.S. Pat. 3,244,758, issued Apr. 5, 1966. In this procedure the reactants are interacted in the presence of an alkali metal catalyst under conditions that give mainly the one-to-one adduct, namely, 5-o-tolylpentene-2. This product is treated with an acidic alkylation catalyst to effect ring closure and yield 1,5-dimethyltetralin. The latter is then dehydrogenated to produce 1,5-DMN using, for example, platinum-on-alumina as catalyst.

The isomerization reactions of various DMN's employing HF or HF—BF$_3$ as catalyst have been described by G. Suld et al., J. Org. Chem., 29, 2939–2946 (1964) and in Suld U.S. Pat. 3,109,036, issued Oct. 29, 1963. These references show that isomerization of 1,5-DMN by means of these catalysts will produce 1,6-DMN and 2,6-DMN but no other isomers.

U.S. Pat. 3,336,411 listed above discloses the isomerization of mixed DMN's by means of silica-alumina or silica-alumina-zirconia catalysts in the presence of hydrogen at temperatures of 250–400° C. to produce 2,6-DMN. The patent teaches that the isomerization product can be subjected to fractional crystallization to selectively separate the 2,6-DMN and that the mother liquor comprising other DMN isomers can be recycled to the isomerization zone.

The selective crystallization of 2,6-DMN from its isomers is described in each of the following U.S. patents referred to above: 3,485,885; 3,541,175 and 3,590,091.

The separation of DMN isomers from each other by selective complexation with various compounds is disclosed in the following U.S. patents which issued May 23, 1972: R. I. Davis et al. 3,665,043 and 3,665,045; and K. A. Scott 3,665,044.

The prior art also discloses the selective separation of various DMN isomers from each other by selective adsorption on certain types of crystalline zeolites, as shown in U.S. Pat. 3,114,782, issued Dec. 17, 1963, R. N. Fleck et al., and U.S. Pat. 3,668,267, issued June 6, 1972, J. A. Hedge.

U.S. Pat. 3,243,469, issued Mar. 29, 1966, A. Schneider, teaches the use of a platinum-on-alumina catalyst for dehydrogenating 2,6-dimethyldecalin to produce 2,6-DMN.

U.S. Pat. 3,255,268, issued June 7, 1966, G. Suld et al., and U.S. Pat. 3,325,551, issued June 13, 1967, G. Suld, both teach the preparation of non-acidic dehydrogenation catalysts by treating platinum-on-alumina with a solution of a basic salt such as lithium carbonate.

SUMMARY OF THE INVENTION

The present invention provides efficacious procedures for converting 5-o-tolylpentene-2 to 2,6-DMN by a continuous multistep process involving sequential steps of cyclization, dehydrogenation and isomerization. The process utilizes hydrogen produced in the dehydrogenation step in at least one of the other steps and advantageously in both the dehydrogenation and isomerization steps.

In one aspect the invention provides a process which comprises:

(A) Passing a feed composed mainly of 5-o-tolylpentene-2 in vapor form over a solid acidic catalyst at a temperature in the range of 200–450° C. and a pressure of 0–500 p.s.i.g. to effect cyclization and form 1,5-dimethyltetralin;

(B) Contacting the reaction product from Step (A) in vapor form with a solid dehydrogenation catalyst at a temperature in the range of 300–500° C., in the presence of hydrogen and at a pressure in the range of 0–500 p.s.i.g. to convert 1,5-dimethyltetralin to 1,5-dimethylnaphthalene by dehydrogenation;

(C) Contacting the resulting vapor mixture of 1,5-dimethylnaphthalene and hydrogen with a solid acidic isomerization catalyst at a temperature in the range of 275–500° C. and a pressure of 0–500 p.s.i.g. to form a mixture of dimethylnaphthalenes including 2,6-dimethylnaphthalene;

(D) Separating hydrogen from the reaction product containing 2,6-dimethylnaphthalene;

(E) And recycling separated hydrogen to a step in the process preceding Step (C), or in other words to either Step (A) or Step (B).

In another embodiment Step (A) is carried out with the feed in liquid phase employing either a liquid or solid acidic cyclizing catalyst, Steps (B), (C) and (D) are effected as above decribed, and separated hydrogen is recycled back to Step (B).

In still another embodiment the dehydrogenation reaction product (1,5-DMN) from Step (B) is condensed and separated from the associated hydrogen gas, the hydrogen is recycled to Step (A), and the 1,5-DMN is isomerized in a subsequent step to form 2,6-DMN.

In any of the embodiments the mixed DMN's from the isomerization step are treated to selectively remove the 2,6-DMN and the other isomers (mainly 1,6-DMN) preferably are recycled to the isomerizer.

BRIEF DESCRIPTION OF THE DRAWINGS

The invention is described with reference to the accompanying drawings wherein.

DESCRIPTION

The 5-o-tolylpentne-2 feed for the present process can be obtained by the reaction of butadiene and o-xylene according to procedures described in the Eberhardt references above cited. This reaction tends to produce minor amounts of higher adducts in addition to the desired one-to-one adduct, 5-o-tolylpentene-2. The latter can be purified, if desired, by distillation before being utilized as feed for the present process.

Figure 1:
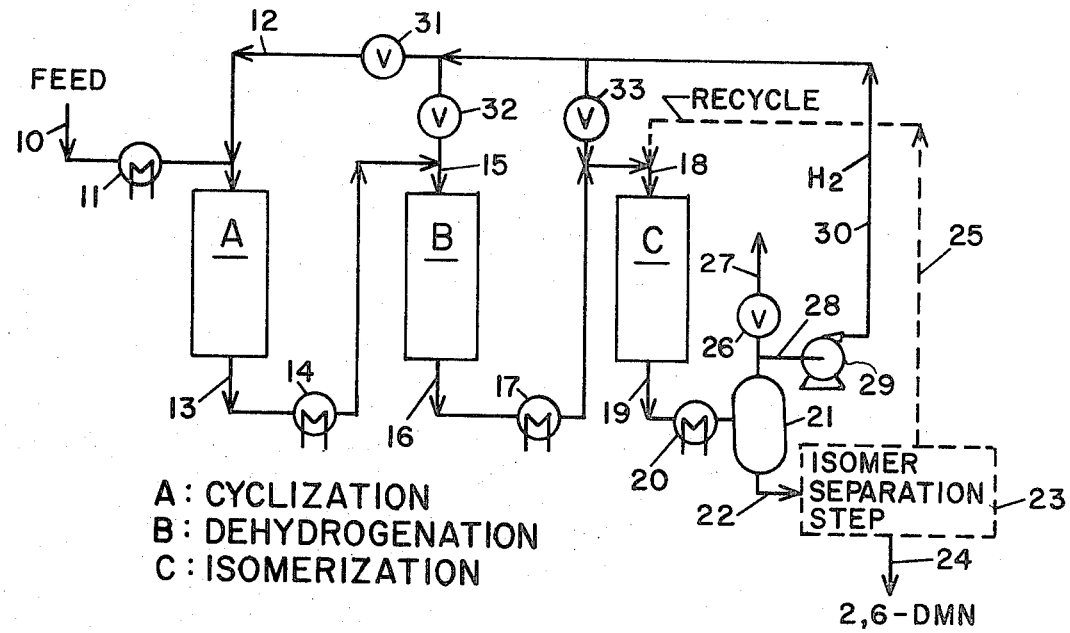
FIGS. 1 and 2 are schematic flowsheets illustrating different ways of practicing the process.

Referring now to FIG. 1, the 5-o-tolylpentene-2 feed enters through line 10 and, in one embodiment of the invention, is heated and vaporized in heater 11 and then enters reaction Zone A. This zone is provided with a solid acidic alkylation catalyst capable of causing cyclization or ring closure as shown in Equation I.

(I)

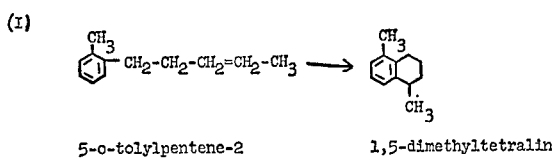

5-o-tolylpentene-2    1,5-dimethyltetralin

The catalyst for this reaction can be any suitable solid acidic catalyst such as silica-alumina, silica-magnesia, silica-alumina-zirconia, acidic crystalline zeolites and the like. Solid phosphoric acid catalysts are particularly suitable for this reaction. This type of catalyst is commercially available and has been described, for example, in U.S. Pat. 2,585,899, issued Feb. 12, 1952, G. E. Langlois, and in U.S. Pat. 3,504,045, issued Mar. 31, 1970, E. J. Scharf et al. and patents cited therein.

The cyclization reaction in Zone A, depicted by Equation I, preferably is carried out in the presence of hydrogen which is admitted to the reactor through recycle line 12. Conditions for this reaction include temperatures in the range of 200–450° C. and pressures in the range of 0–500 p.s.i.g. The presence of the hydrogen is beneficial in that it tends to suppress the formation of high boiling by-products ($C_{24}$ dimer alkylate) and improve the selectivity of the reaction for obtaining 1,5-dimethyltetralin.

Reaction products leave Zone A as a vapor through line 13 and are sent, without being condensed, to line 15 and into dehydrogenation Zone B. Reaction temperatures in this zone are in the range of 300–500° C. and generally higher than in Zone A. Accordingly a heater 14 connected with line 13 is provided to raise the temperature of the mixture of hydrogen and 1,5- dimethyltetralin (typically 240° C. from Zone A) to the desired level for dehydrogenation (typically 430° C. average). Since this reaction is endothermic, means (not shown in FIG. 1) may be provided for supplying heat to the reactants in Zone B to prevent the temperature from dropping too low before the dehydrogenation reaction is completed.

A solid dehydrogenation catalyst is employed in Zone B to catalyze the reaction given by Equation II.

(II)

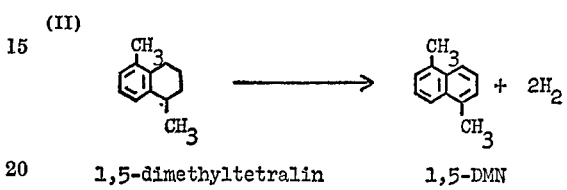

1,5-dimethyltetralin        1,5-DMN

As shown, the reaction produces two moles of hydrogen for each mole of reactant. This reaction thus serves as the source of supply of hydrogen used in Zone A, as well as that used in Zone C in the embodiment illustrated by FIG. 1. This reaction is carried out at a temperature level in the range of 300–500° C. and a pressure in the range of 0–500 p.s.i.g. Any solid dehydrogenation catalyst capable of effecting the dehydrogenation and exhibiting a reasonable life under these conditions can be used, including catalysts composed of noble metals on carriers such as reforming catalysts, chromia-alumina and the like. However it is preferable to use a platinum-on-alumina dehydrogenation catalyst and particularly platinum on non-acidic alumina, preferably eta alumina, as this kind of catalyst has been found to exhibit a particularly long life under the conditions employed in dehydrogenation Zone B.

The reaction in Zone B not only brings about the desired dehydrogenation but results in an unexpected benefit, in that any $C_{24}$ dimeric alkylation product which may have been formed in Zone A tends to be reconverted under the conditions of Zone B to $C_{12}$ material including dimethylnaphthalene.

In the embodiment of FIG. 1 the reaction mixture from dehydrogenation Zone B passes as a vapor through line 16 to line 18 and into isomerization Zone C where temperatures in the range of 275–500° C. and pressures of 0–500 p.s.i.g. are maintained. Since it is usually desirable to carry out the isomerization reaction at a temperature (typically 320° C.) lower than the average temperature of Zone B, means are provided, illustrated as heat exchanger 17, for regulating the temperature of the mixture of 1,5-DMN and hydrogen passing through line 16.

The catalyst employed in Zone C is a solid acidic isomerization catalyst and can be of the same types as described with respect to Zone A. Suitable acidic catalysts include silica-alumina or silica-alumina-zirconia as taught in U.S. Pat. 3,336,411 listed above and crystalline zeolite catalysts as described in aforesaid United States applications Ser. No. 207,870 and Ser. No. 208,001. Solid phosphoric acid catalysts as employed in the processes of aforesaid U.S. Pats. 2,585,899 and 3,504,045 likewise are suitable.

The reaction in Zone C causes the 1,5-DMN to isomerize to only two of its isomers, since a shift of a methyl substituent cannot occur between a 2-position and a 3-position on the naphthalene nucleus, as disclosed in aforesaid U.S. Pat. 3,109,036. The shifts that can occur in this reaction are illustrated by Equation III.

(III)    1,5-DMN⇌1,6-DMN⇌2,6-DMN

Thus the only isomers produced by the isomerization reaction are 1,6-DMN and the desired 2,6-DMN. At equilibrium for this reaction at a temperature level of 320° C., the 1,5-isomer will remain only in minor amount of the order of 10%; and the 1,6- and 2,6-isomers will constitute most of the remainder, being present in roughly equal proportions. A small amount of disproportionation and other reactions also may occur during this isomerization, resulting in the formation of, for example, a total of 5–10% of monomethyl- and trimethylnaphthalenes, 1–3% of other DMN's (mainly 1,7-DMN), and say 1–3% of $C_{24}$ dimers of DMN's. If desired, these various by-products can be separated from the DMN's by subjecting the product from Zone C to fractional distillation (not shown) before the mixed DMN's are further processed.

In the simplified illustration of the process in FIG. 1, the isomerization product from Zone C passes through line 19 and condenser 20 to gas-liquid separator 21. Condenser 20 is operated so as to liquefy the isomer products without reducing temperature enough to cause any crystallization. The liquid product is removed from separator 21 through line 22 and sent to an isomer separation step illustrated schematically at 23. This separation can be done in any suitable manner, such as by crystallization, adsorption or selective complexation, so as to selectively recover 2,6-DMN from the other isomers. The 2,6-DMN is removed via line 24 as the desired product. The other isomers optionally can be recycled, as indicated by dashed line 25, for further conversion to 2,6-DMN in Zone C.

The gas phase, composed principally of hydrogen, is removed from the top of separator 21 and partly vented from the system through valve 26 and line 27. The rest of the hydrogen flows through line 28 to compressor 29 where it is recompressed for reuse in the system. The pressurized hydrogen is then recycled through line 30 back to a step preceding Zone C. Preferably the hydrogen is sent through valve 31 and line 12 back to Zone A for reuse in each of Zones A, B and C. However, the process can also be operated by closing valve 31, opening valve 32 and recycling the hydrogen from line 30 through line 15 to Zone B. Also part of the hydrogen from line 30 optionally can be recycled through valve 33 and line 18 into Zone C. This will permit adjustment of the hydrogen to hydrocarbon ratio in Zone C independently of such ratio in the effluent from Zone B and allow maintenance of a selected ratio regardless of variations in the amount of DMN's recycled through dashed line 25.

By operating the process as described for FIG. 1, no condensers and separators are needed between Zones A, B and C, and only the single compressor 29 is required for supplying hydrogen to each of the three zones at the pressures at which they are operated. The arrangement thus minimizes plant investment and operating costs.

The process of FIG. 1 can be varied by carrying out the cyclization in Zone A by a liquid phase reaction, in which case the feed from line 10 is heated to the selected cyclization temperature in heater 11 but not vaporized. Suitable conditions for such liquid phase reaction employing a solid phosphoric acid catalyst include a temperature of 200–275° C., LHSV of 0.1–5 and preferably 0.3–2, and whatever pressure is needed to maintain the hydrocarbons as a liquid. Another suitable type of catalyst for liquid phase cyclization comprises acidic ion exchange resins, in which case reaction temperatures in the range of 70–140° C., preferably 110–125° C., should be employed. The liquid phase cyclization reaction can also be carried out by means of other types of catalysts such as acidic crystalline zeolites, siliceous cracking catalysts or liquid catalysts such as hydrofluoric or sulfuric acid. When a liquid catalyst is used, the temperature for effecting the cyclizing reaction can be relatively low, e.g. 0–100° C. The liquid reaction product in any of these cases is then vaporized in heater 14 and dehydrogenated in Zone B as previously described. In this embodiment valve 31 is closed and the hydrogen is recycled through valve 32 and line 15 to Zone B.

Regardless of whether the cyclization reaction of Zone A is carried out in vapor or liquid phase, the resulting 1,5-dimethyltetralin generally is associated with an appreciable amount of various types of by-products. The following tabulation shows typical compositions for the cyclization product, the components being listed in the order of increasing boiling points:

| | Percent |
|---|---|
| Tolylpentane | 0.5–2 |
| Tolylpentenes | 0.5–4 |
| Methylethylindanes | 0.5–2 |
| Dimethyltetralins (other than 1,5-) | 0.5–4 |
| 1,5-dimethyltetralin | 80–97 |
| 1,5-DMN | 0.2–0.5 |
| $C_{24}$ dimers | 1–8 |

In spite of the various by-products formed, such material can be processed under the conditions described for Zone B without rapid deactivation of the dehydrogenation catalyst when a platinum-on-alumina catalyst is employed. Particularly long catalyst lives can be achieved when the catalyst used is platinum-on-eta alumina that has been rendered non-acidic by treatment with a solution of an alkaline salt such as lithium carbonate. Under the conditions maintained in Zone B the $C_{24}$ dimer material is converted almost entirely to $C_{12}$ products including DMN's as previously mentioned. It has further been found that the olefinic components (tolylpentenes) rapidly become saturated in Zone B and thus also do not tend to cause carbonaceous deposits that deactivate the catalyst.

Figure 2:
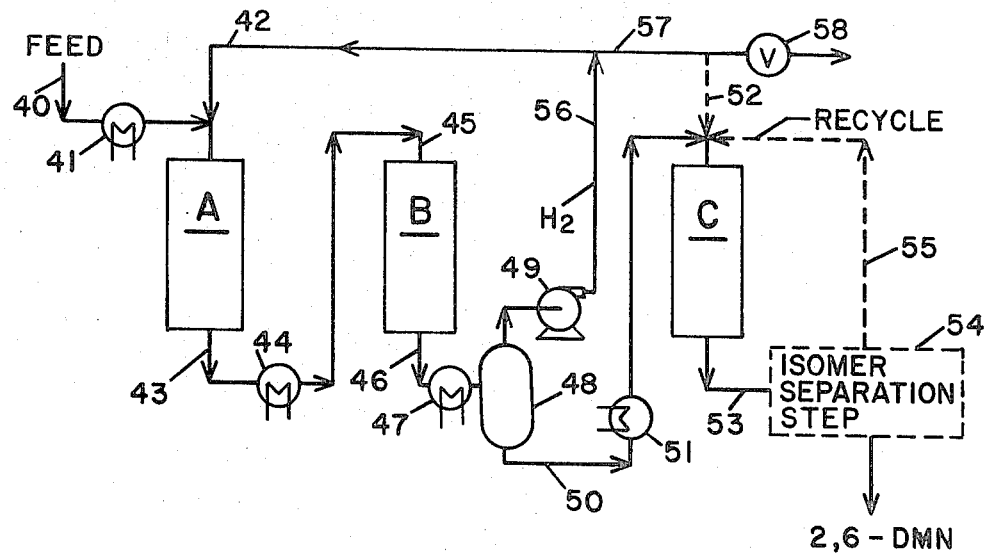

In the embodiment illustrated in FIG. 2 reaction Zones A and B are the same as the corresponding zones in FIG. 1 and they are operated with reactants in vapor phase under the same conditions utilizing the same types of catalysts. The process of FIG. 2 differs in that the product from Zone B is condensed and the hydrogen is recycled back to Zone A. The feed enters through line 40 and is vaporized in heater 41 and then introduced into Zone A where reaction occurs according to Equation I. The mixture of 1,5-dimethyltetralin and hydrogen passes through line 43, heater 44 and line 45 into the top of Zone B wherein reaction occurs according to Equation II. The reaction mixture flows from Zone B through line 46 and condenser 47 and into gas-liquid separator 48.

The 1,5-DMN from separator 48 passes via line 50 through temperature regulating means 51 for adjusting the temperature to whatever level is desired for reaction in Zone C. If desired, this reaction can be carried out utilizing HF or HF—$BF_3$ as catalyst, as described in aforesaid. U.S. Pat. 3,109,036 and the J. Org. Chem. article by Suld et al. This procedure involves dissolving the 1,5-DMN in an inert solvent, such as n-hexane or benzene, and contacting the solution at 0–100° C. with HF or HF—$BF_3$ to effect the isomerization reaction. Alternatively, the isomerization in Zone C can be carried out as a vapor phase reaction in the manner described in connection with FIG. 1.

The isomerization product from Zone C flows through line 53 to an isomer separation zone, indicated at 54, from which 2,6-DMN is removed as a product. The remaining isomers optionally can be recycled through dashed line 55 to Zone C for further conversion.

The gas phase flows from the top of separator 48 into compressor 49 and then is recycled through lines 56 and 42 to cyclization Zone A. Excess hydrogen can be removed from the system via line 57 and valve 58. When the isomerization reaction of Zone C is carried out in vapor phase as described in conjunction with FIG. 1, a portion or all of this excess hydrogen from line 57 can advantageously be used in Zone C, being admitted thereto as indicated by dashed line 52. In such case means (not shown in FIG. 2) should be provided for separating the hydrogen from the isomer products obtained through line 53.

Figure 3:
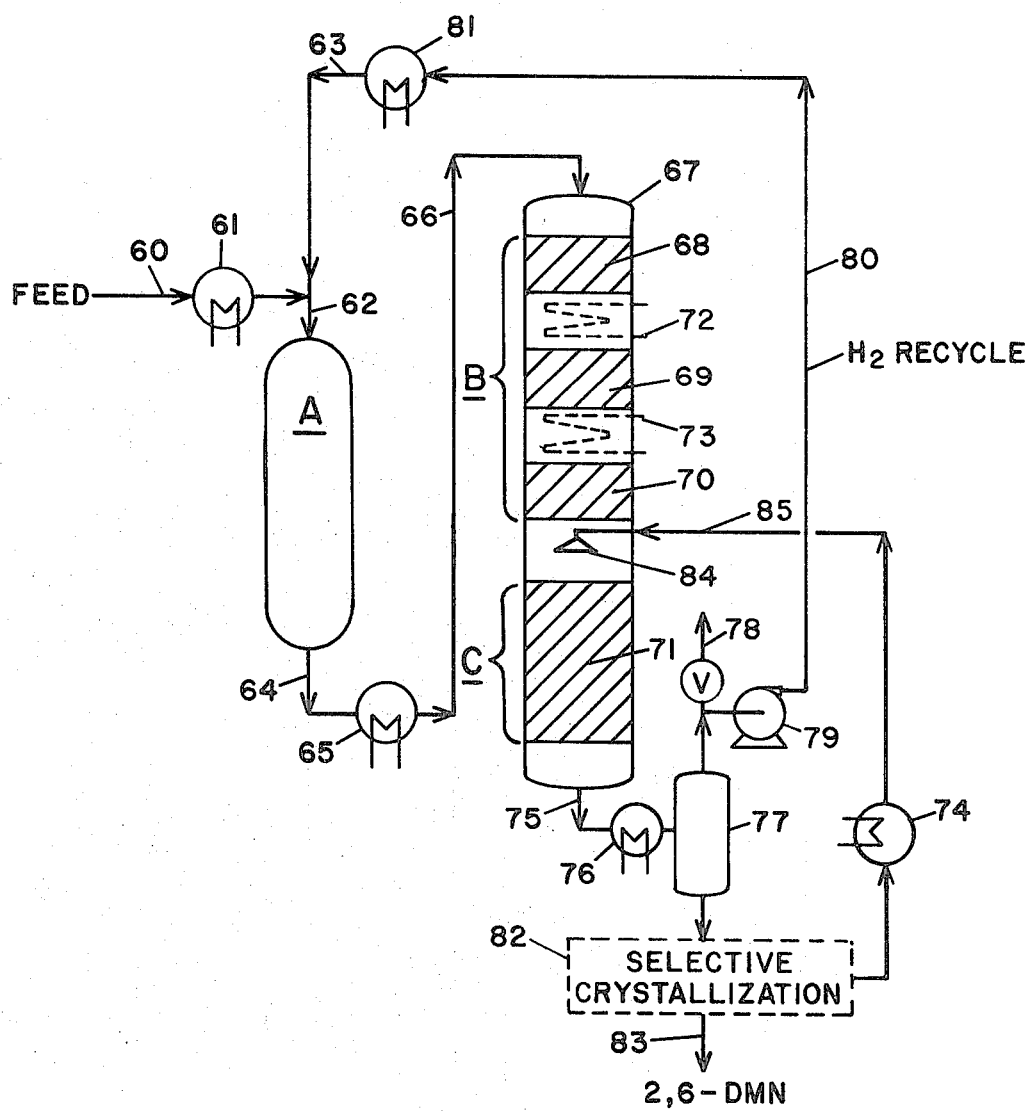
FIG. 3 is a diagrammatic illustration of a preferred manner of carrying out the process.

A preferred manner of practicing the invention is illustrated by FIG. 3. In this embodiment a single reactor column is used for reaction Zones B and C, the column being provided with dehydrogenation catalyst in the form of three superposed beds 68, 69 and 70 in its upper portion (Zone B) and a bed 71 of acidic isomerization catalyst in its lower portion (Zone C). Heating means, illustrated as coils 72 and 73, are provided between the Zone B beds to supply heat to compensate for the endothermic nature of the dehydrogenation reaction. The catalysts for Zones A, B and C are the same as described for the respective zones in FIG. 1.

The feed enters the FIG. 3 system via line 60, is vaporized in heater 61 and is introduced, together with recycled hydrogen from line 63, through line 62 to cyclization Zone A which operates under the same conditions as previously described. Preferred conditions for this reaction include a temperature of 210–250° C. and pressure of 20–200 p.s.i.g. Other conditions generally used include a liquid hourly space velocity (LHSV) of 0.1–5, preferably 0.3–2, and a hydrogen to hydrocarbon mole ratio of 0.1–10, preferably 1–5.

While the main reaction in Zone A is cyclization as depicted by Equation I, interaction between the $C_{12}$ feed molecules and the $C_{12}$ cyclization product can result in the formation of $C_{24}$ dimeric alkylation products. These high boiling products, if present in substantial amounts during the next step of the process, tend to cause progressive deactivation of the catalyst and help to shorten its life. The presence of the recycled hydrogen in Zone A is beneficial in that it minimizes the amount of these higher boiling products formed and avoids any necessity of removing them prior to the next reaction step.

The mixture from Zone A passes through line 64, heater 65, line 66 and into the top of column 67. Heat is supplied by heater 65 and coils 72 and 73 so as to maintain a temperature throughout Zone B in the range of 300–500° C. and preferably of 375–450° C. Preferably a pressure of 20–200 p.s.i.g. is maintained in this zone. Other conditions include LHSV of 0.1–10, preferably 3–7, and hydrogen to hydrocarbon mole ratio of 0.1–10, preferably 1–5. While various kinds of dehydrogenation catalysts can be used for effecting the dehydrogenation in Zone B, it is distinctly preferable to employ a platinum-on-alumina catalyst and especially non-acidic platinum-on-alumina, as this catalyst has been found to provide an unexpectedly long life under these reaction conditions. The preparation of such catalyst is described in aforesaid U.S. Pats. 3,255,268 and 3,325,551.

Under the conditions maintained in Zone B not only does dehydrogenation take place as shown in Equation II but also an unexpected benefit occurs, namely, the reconversion of $C_{24}$ dimeric alkylation material to $C_{12}$ products. This material converts partly back to dimethylnaphthalene and in part to a by-product tentatively identified as tolylpentane. This fortuitous result is beneficial in that it eliminates the presence of high boiling materials in the reaction mixture effluent from Zone B and improves the yield of desired product. The conditions in Zone B also rapidly effect hydrogenation of any olefinic bonds, converting any uncyclized tolylpentene to tolylpentane, thus avoiding any possibility of this type of component undergoing polymerization and contributing to catalyst deactivation.

The vapor mixture from the bottom of Zone B passes directly to the top of isomerization catalyst bed 71 constituting Zone C. The temperature of the mixture is regulated to the level desired for the Zone C reaction by the introduction of recycle DMN's through line 85 and sparger 84. For this purpose a heat exchanger 74 is provided in the recycle stream so that the stream temperature can be adjusted as required to secure the proper temperature in bed 71. The broad temperature range for the isomerization reaction is 275–500° C., with the preferred temperature being 325–375° C. Pressure in Zone C is determined by the pressure maintained in Zone B, and the hydrogen to hydrocarbon ratio depends upon the proportion of these components in the vapor effluent flowing from the bottom of bed 70. LHSV for Zone C falls in the range of 0.1–5 and preferably 0.5–2.

The effluent from the bottom of column 67 passes through line 75 and condenser 76 to gas-liquid separator 77. Condenser 76 is operated so as to reduce the temperature sufficiently to liquefy the dimethylnaphthalenes without causing any of the isomers to crystallize. The hydrogen phase from the top of the separator is partly vented from the system through valved line 78, and the rest is recompressed in compressor 79 and then recycled through line 80, heater 81 and lines 63 and 62 to Zone A. The hydrocarbon isomers from the bottom of separator 77 are sent to a crystallization step for selectively crystallizing the 2,6-isomer, which has the highest melting point (112° C.), from the 1,5-DMN (M.P.=82° C.) and 1,6-DMN (M.P.=—14° C.). The 2,6-DMN is removed through line 83 as the desired product, while the mother liquor comprising largely the 1,6-isomer together with minor proportions of 1,5-DMN and 2,6-DMN is recycled through heat exchanger 74 and line 85 to isomerization Step C.

The invention thus provides an efficacious way of effecting the multistep conversion of 5-o-tolylpentene-2 to 2,6-dimethylnaphthalene employing a minimum of processing equipment. Once the feed has been vaporized, the reactants can flow as vapors successively through each of the conversion Zones A, B and C without any intermediate condensation, so that handling of liquids is not required until after isomerization Step C. Hydrogen generated in Zone B can beneficially be used in Zones A and C with only one compressor being required for the entire system. The hydrogen in Zone A tends to minimize the formation of heavy material ($C_{24}$ dimeric alkylation products), and furthermore any small amount thereof that is formed advantageously becomes reconverted to lower boiling material in Zone B.

Data presented in the accompanying table illustrate the unexpected advantages of employing platinum-on-alumina as the dehydrogenation catalyst for the Zone B reaction. The tabulated data are for comparative runs made in a continuous manner employing various commercially available dehydrogenation catalysts. The initial feed for each run was cyclized product from which the lowest and highest boiling portions had been removed by distillation. It contained about 98% 1,5-dimethyltetralin and essentially no olefinic components nor $C_{24}$ dimers. This was the sole feed charged in Runs 1–4. In Runs 5 and 6, which employed platinum-on-eta alumina catalysts that were, respectively, untreated and treated with aqueous $Li_2CO_3$ solution, this feed was used until a feed throughput of, respectively, 800 and 1000 lbs./lb. of catalyst had been reached. Thereafter cyclized product, which had been fractionated to separate only the heavy ends and which contained about 92% 1,5-dimethyltetralin, about 1% tolylpentenes and all of the other by-products usually associated therewith except the $C_{24}$ dimers, was employed as feed during the rest of these runs. For all runs "catalyst life" was considered coextensive with the period during which the 1,5-dimethyltetralin was converted to 1,5-DMN to the extent of at least 90% of the equilibrium value at the temperature of operation. The catalyst life is given in terms both of lbs. feed/lb. of catalyst and in days of continuous operation before the 90% of equilibrium level was reached. Also in all runs the catalyst bed was composed of an equal volume mixture of quartz and the catalyst, each material having 14–48 mesh size (Tyler Sieve Series).

TABLE.—DEHYDROGENATION OF 1,5-DIMETHYLTETRALIN TO 1,5-DMN

Initial feed, 98% 1,5-dimethyltetralin; pressure, 150 p.s.i.g.; $H_2$/hydrocarbon mole ratio, 10:1

| Run number | Dehydrogenation catalyst | Approx. temperature, °C. | LSHV | Conversion, wt. percent | Selectivity, wt. percent | Catalyst life [1] Lbs. feed/lb. catalyst | Days |
|---|---|---|---|---|---|---|---|
| 1 | Chromia-on-$Al_2O_3$ | 400–440 | 0.4–1.2 | 91–98 | 87–97 | 45 | 4 |
| 2 | 0.5% Pd-on-$Al_2O_3$ (gamma) | 435 | 4 | 95–97 | 97–98 | 105 | 1 |
| 3 | 0.5% Pd-on-$Al_2O_3$ (alpha) | 430 | 3 | 80 | 97–98 | 0 | 0 |
| 4 | 0.5% Pd-on-carbon | 440 | 4 | 80 | 76–89 | 0 | 0 |
| 5 [2] | 0.6% Pt-on-$Al_2O_3$ (eta) | 430 | 4 | 97–98 | 92–97 | >1,800 | >20 |
| 6 [3] | 0.6% Pt-on-$Al_2O_4$ (eta) treated with $Li_2CO_3$ | 430 | 5 | 97–98 | 97–98 | >6,000 | >59 |

[1] To 90% of equilibrium.
[2] Changes were made after reaching the following throughputs:
  800 lbs./lb.—lower purity feed used containing 92% 1,5-dimethyltetralin and 1% tolylpentenes.
  1,140 lbs./lb.—$H_2$/hydrocarbon ratio reduced to 5:1.
  1,300 lbs./lb.—pressure reduced to 75 p.s.i.g.
[3] After 1,000 lbs./lb. same lower purity feed used as in latter part of Run 5.

The results given in the table illustrate the unexpected superiority of platinum-on-alumina dehydrogenation catalysts in effecting the Zone B conversion. In Run 1 the chromia-on-alumina catalyst required a low space rate in order to secure a conversion of 90% or more of the equilibrium values and it exhibited a life of only 4 days. Neither of the palladium catalysts of Runs 3 and 4 was capable of achieving a conversion as high as 90% of the equilibrium value under the conditions of these runs. The palladium-on-alumina catalyst of Run 2 did effect this high conversion initially but only for one day. The catalyst of Run 5, which was a commercial acidic reforming catalyst containing chloride, was quite effective and exhibited a reasonably long life of substantially beyond 1800 lbs./lb. of catalyst (corresponding to 20 days). While not shown in the table, operation of Run 5 with various changes in operating conditions, including pressure reduction to 10 p.s.i.g. for a time, was continued to a throughput of 2300 lbs./lb. (28 days) as which time conversion dropped below the 90% of equilibrium level. The data for Run 6, however, show that neutralizing the acidity of this catalyst by treatment with $Li_2CO_3$ solution produces a markedly superior catalyst for the Zone B reaction. After a throughput of 6000 lbs./lb. corresponding to 59 days of operation, the catalyst showed no substantial signs of deactivation and appeared to be capable of much longer life.

Another continuous dehydrogenation run (Run 7) was made employing a $Li_2CO_3$-treated Pt-on-$Al_2O_3$ (eta) catalyst under conditions similar to those used in Run 6. In this case the feed was cyclized product from Step A which had not been fractionated and contained $C_{24}$ dimers along with the lighter by-product components. Specifically, it had an average composition about as follows:

| | |
|---|---|
| Tolylpentanes | 1.0 |
| Tolylpentenes | 1.0 |
| Methylethylindanes | 1.8 |
| Dimethyltetralins (other than 1,5-) | 1.6 |
| 1,5-dimethyltetralin | 89.4 |
| 1,5-DMN | 0.5 |
| $C_{24}$ dimers | 4.7 |

The conditions of Run 7 were approximately as follows: temperature=430° C.; pressure=150 p.s.i.g.; $H_2$/hydrocarbon mole ratio=10:1; and LHSV=3–4. Analysis by GLC of the reaction product from this run showed that most of the $C_{24}$ material was converted back to $C_{12}$ products including dimethylnaphthalene and that the product consistently contained only about 0.3% of the $C_{24}$ material. This high boiling material seemed to have no appreciable effect on deactivation of the non-acidic platinum-on-alumina catalyst employed in this run. After 26 days of operation at which time the feed throughput was beyond 2000 lbs./lb. of catalyst, no decrease in the activity level of the catalyst had been detected and the catalyst appeared to be capable of far longer use.

The invention claimed is:

1. Process for converting 5-o-tolylpentene-2 to 2,6-dimethylnaphthalene which comprises:

(A) passing a feed composed mainly of 5-o-tolylpentene-2 in vapor form over a solid acidic catalyst at a temperature in the range of 200–450° C. and a pressure of 0–500 p.s.i.g. to effect cyclization and form 1,5-dimethyltetralin;

(B) contacting the reaction product from Step (A) in vapor form with a solid dehydrogenation catalyst at a temperature in the range of 300–500° C., in the presence of hydrogen and at a pressure in the range of 0–500 p.s.i.g. to convert 1,5-dimethyltetralin to 1,5-dimethylnaphthalene by dehydrogenation;

(C) contacting the resulting vapor mixture of 1,5-dimethylnaphthalene and hydrogen with a solid acidic isomerization catalyst at a temperature in the range of 275–500° C. and a pressure in the range of 0–500 p.s.i.g. to form a mixture of dimethylnaphthalenes including 2,6-dimethylnaphthalene;

(D) separating hydrogen from the reaction product containing 2,6-dimethylnaphthalene;

(E) and recycling separated hydrogen to a step in the process preceding Step (C).

2. Process according to claim 1 wherein said separated hydrogen is recycled to Step (A).

3. Process according to claim 1 wherein said separated hydrogen is recycled to Step (B).

4. Process according to claim 1 wherein 2,6-dimethylnaphthalene is recovered from the reaction product from Step (C) by selective removal from other dimethylnaphthalenes.

5. Process according to claim 4 wherein said other dimethylnaphthalenes are recycled to Step (C) for isomerization to the 2,6-isomer.

6. Process according to claim 5 wherein Steps (B) and (C) are carried out in a single reactor column containing a bed of said dehydrogenation catalyst adjacent its inlet end and a bed of said acidic isomerization catalyst adjacent its other end, and wherein said other dimethylnaphthalenes are recycled by being introduced into the vapor stream between the respective beds.

7. Process according to claim 6 wherein said dehydrogenation catalyst comprises platinum on non-acidic alumina.

8. Process according to claim 1 wherein Step (A) is carried out at a temperature of 210–250° C. and a pressure of 20–200 p.s.i.g., the vapor reaction product therefrom is heated and reacted in Step (B) at a temperature of 375–450° C. and a pressure of 20–200 p.s.i.g., and the vapor reaction product from Step (B) is reacted in Step (C) at a temperature of 325–375° C. and a pressure of 20–200 p.s.i.g.

9. Process according to claim 1 wherein 2,6-dimethylnaphthalene is recovered from the reaction product from Step (C) by selective crystallization thereof from other dimethylnaphthalenes, and said other dimethylnaphthalenes are admixed with vapor reaction product from Step (B) to form a mixture having a temperature of 325–375° C. for isomerizatioin in Step (C).

10. Process according to claim 1 wherein the catalyst in Step (B) comprises platinum on non-acidic alumina.

11. Process for converting 5-o-tolylpentene-2 to 2,6-dimethylnaphthalene which comprises:
   (A) passing a feed composed mainly of 5-o-tolylpentene-2 in vapor form and in admixture with recycled hydrogen hereinafter specified over a solid acidic catalyst at a temperature in the range of 200–450° C. and a pressure of 0–500 p.s.i.g. to effect cyclization and form 1,5-dimethyltetralin;
   (B) contacting the resutling vapor mixture of 1,5-dimethyltetralin and hydrogen with a solid dehydrogenation catalyst at a temperature in the range of 300–500° C. and a pressure in the range of 0–500 p.s.i.g. to convert 1,5 - dimethyltetralin to 1,5-dimethylnaphthalene by dehydrogenation;
   (C) separating hydrogen from the reaction product containing 1,5-dimethylnaphthalene;
   (D) passing separated hydrogen to Step (A) as said recycled hydrogen;
   (E) and contacting said product containing 1,5 - dimethylnaphthalene with an acidic isomerization catalyst under isomerizing conditions to form a mixture of dimethylnaphthalenes including 2,6 - dimethylnaphthalene.

12. Process according to claim 11 wherein Step (A) is carried out at a temperature of 210–250° C. and a pressure of 20–200 p.s.i.g., and the vapor reaction product therefrom is heated and reacted in Step (B) at a temperature of 375–450° C. and a pressure of 20–200 p.s.i.g.

13. Process for converting 5-o-tolylpentene-2 to 2,6-dimethylnaphthalene which comprises:
   (A) contacting a feed composed mainly of 5-o-tolylpentene-2 with an acidic catalyst under cyclizing conditions to effect cyclization and form 1,5-dimethyltetralin;
   (B) contacting the reaction product from Step (A) in vapor form with a solid dehydrogenation catalyst at a temperature in the range of 300–500° C., in the presence of hydrogen and at a pressure in the range of 0–500 p.s.i.g. to convert 1,5-dimethyltetralin to 1,5-dimethylnaphthalene by dehydrogenation;
   (C) contacting the resulting vapor mixture of 1,5-dimethylnaphthalene and hydrogen with a solid acidic isomerization catalyst at a temperature in the range of 275–500° C. and a pressure in the range of 0–500 p.s.i.g. to form a mixture of dimethylnaphthalenes including 2,6-dimethylnaphthalene;
   (D) separating hydrogen from the reaction product containing 2,6-dimethylnaphthalene;
   (E) and recycling hydrogen to Step (B).

14. Process according to claim 13 wherein 2,6-dimethylnaphthalene is recovered from the reaction product from Step (C) by selective removal from other dimethylnaphthalenes.

15. Process according to claim 14 wherein said other dimethylnaphthalenes are recycled to Step (C) for isomerization to the 2,6-isomer.

16. Process according to claim 15 wherein Steps (B) and (C) are carried out in a single reactor column containing a bed of said dehydrogenation catalyst adjacent its inlet end and a bed of said acidic isomerization catalyst adjacent its other end, and wherein said other dimethylnaphthalenes are recycled by being introduced into the vapor stream between the respective beds.

17. Process according to claim 16 wherein said dehydrogenation catalyst comprises platinum on non-acidic alumina.

18. In a process for converting 5-o-tolylpentene-2 to dimethylnaphthalene, the steps which comprise:
   (A) converting the 5-o-tolylpentene-2 mainly to 1,5-dimethyltetralin by contacting same with an acidic catalyst under cyclizing conditions at which a cyclization reaction occurs to give reaction product composed mainly of 1,5-dimethyltetralin but also containing $C_{24}$ dimeric alkylation product;
   (B) contacting said reaction product in vapor phase and in the presence of hydrogen with a solid dehydrogenation catalyst comprising platinum-on-alumina at a temperature of 300–500° C., whereby 1,5-dimethyltetralin is dehydrogenated to 1,5-dimethylnaphthalene and said $C_{24}$ dimeric alkylation product is converted to $C_{12}$ products including dimethylnaphthalene;
   (C) recovering hydrogen produced by the dehydrogenation reaction and recycling same in the process to Step (A) or Step (B).

19. A process according to claim 18 wherein said dehydrogenation catalyst is platinum on non-acidic alumina.

20. A process according to claim 19 wherein said alumina is eta alumina.

21. A process according to claim 18 wherein the catalyst in Step (A) is a solid phosphoric acid catalyst.

22. A process according to claim 18 wherein the catalyst in Step (A) is a solid phosphoric acid catalyst and the temperature is 210–250° C., and wherein the catalyst in Step (B) is plantinum on non-acidic alumina and the temperature is 375–450° C.

23. A process according to claim 22 wherein said alumina is eta alumina.

24. In a process in which 5-o-tolylpentene-2 is cyclized in the presence of an acidic catalyst to 1,5-dimethyltetralin and in which process by-product higher than $C_{12}$ is formed, the improvement which comprises subjecting said by-product to dehydrogenation conditions in the presence of a solid dehydrogenation catalyst to convert at least some of said by-product to dimethylnaphthalene.

25. Process according to claim 24 in which said byproduct is a $C_{24}$.

26. Process according to claim 24 in which said dehydrogenation catalyst is platinum on non-acidic alumina.

References Cited
UNITED STATES PATENTS

| | | | |
|---|---|---|---|
| 3,244,758 | 4/1966 | Eberhardt | 260—668 B |
| 3,109,036 | 10/1963 | Suld et al. | 260—668 A |
| 3,336,411 | 8/1967 | Benham | 260—668 F |
| 3,207,801 | 9/1965 | Frilette et al. | 260—668 F |
| 3,428,698 | 2/1969 | Peterson | 260—668 F |

CURTIS R. DAVIS, Primary Examiner

U.S. Cl. X.R.

260—668 A, 668 D